(12) United States Patent
Jurzak et al.

(10) Patent No.: US 9,386,568 B2
(45) Date of Patent: Jul. 5, 2016

(54) METHOD AND APPARATUS FOR FREQUENCY ALLOCATION IN A TRUNKED RADIO COMMUNICATION SYSTEM

(75) Inventors: Pawel Jurzak, Cracow (PL); Jim Bellizio, Highlands Ran, CO (US); Waldemar K. Dworakowski, Warsaw (PL); Piotr Kuzio, Cracow (PL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 194 days.

(21) Appl. No.: 14/367,292

(22) PCT Filed: Dec. 30, 2011

(86) PCT No.: PCT/PL2011/000145
§ 371 (c)(1),
(2), (4) Date: Jan. 14, 2015

(87) PCT Pub. No.: WO2013/100771
PCT Pub. Date: Jul. 4, 2013

(65) Prior Publication Data
US 2015/0305007 A1 Oct. 22, 2015

(51) Int. Cl.
*H04W 72/04* (2009.01)
*H04W 72/10* (2009.01)
(Continued)

(52) U.S. Cl.
CPC ......... *H04W 72/0406* (2013.01); *H04L 45/245* (2013.01); *H04W 72/10* (2013.01); *H04W 76/021* (2013.01); *H04W 4/10* (2013.01); *H04W 84/08* (2013.01); *H04W 88/02* (2013.01); *H04W 88/08* (2013.01); *H04W 88/12* (2013.01)

(58) Field of Classification Search
CPC ..... H04W 4/22; H04W 76/007; H04W 84/08; H04W 72/02
See application file for complete search history.

(56) References Cited

U.S. PATENT DOCUMENTS

| 4,716,407 | A | * | 12/1987 | Borras | .................. | H04W 84/08 340/2.4 |
| 6,058,307 | A | * | 5/2000 | Garner | ............... | H04B 7/18539 455/12.1 |

(Continued)

FOREIGN PATENT DOCUMENTS

CA 2261410 A1 8/1999

OTHER PUBLICATIONS

PCT International Search Report Dated Sep. 21, 2012 for Counterpart Application PCT/PL2011/000145.

*Primary Examiner* — Benjamin Lamont

(57) ABSTRACT

A wireless communication system (200) for providing two-way radio communication includes a base station (340) comprising a receiver (352) and a transmitter (354). The receiver receives transmissions from a first mobile communication unit (210) on a first frequency, assigned for reception. The transmitter transmits on a second frequency, assigned for transmission. The base station (340) is operable to receive a preemption call from a second mobile communication unit (220) on the first frequency, when the first frequency is not in use for reception and the second frequency is in use for transmission. Otherwise the base station (340) receives a preemption call on the second frequency. The base station (340) may comprise a second receiver (344), operable to receive the preemption call on the second frequency during a planned interruption to transmissions from the transmitter (354). Alternatively, the receiver (352) may receive the preemption call on the second frequency, during the transmission interruption.

18 Claims, 8 Drawing Sheets

| SCENARIO | ACTIVITY OF RECEIVER 352, PRIOR TO PRE-EMPTION CALL | ACTIVITY OF TRANSMITTER 354, PRIOR TO PRE-EMPTION CALL | FREQUENCY CHOSEN FOR PRE-EMPTION CALL |
|---|---|---|---|
| SCENARIO 1 | IDLE OR RECEIVING UPLINK CALL ON FIRST FREQUENCY | IDLE | SECOND FREQUENCY |
| SCENARIO 2 | IDLE | TRANSMITTING DOWNLINK CALL ON SECOND FREQUENCY | FIRST FREQUENCY |
| SCENARIO 3 | RECEIVING UPLINK CALL ON FIRST FREQUENCY | TRANSMITTING THE 'REPEAT' CALL ON DOWNLINK ON SECOND FREQUENCY | SECOND FREQUENCY |

(51) Int. Cl.
   *H04L 12/709*   (2013.01)
   *H04W 76/02*   (2009.01)
   *H04W 4/10*   (2009.01)
   *H04W 84/08*   (2009.01)
   *H04W 88/02*   (2009.01)
   *H04W 88/08*   (2009.01)
   *H04W 88/12*   (2009.01)

(56) References Cited

U.S. PATENT DOCUMENTS

| | | | |
|---|---|---|---|
| 6,308,079 | B1 | 10/2001 | Pan et al. |
| 8,280,377 | B2 | 10/2012 | Lee et al. |
| 2006/0013182 | A1* | 1/2006 | Balasubramanian H04L 27/2608 370/343 |
| 2006/0229080 | A1* | 10/2006 | Khan .................... H04W 48/18 455/450 |
| 2007/0060182 | A1* | 3/2007 | Chen ....................... H04W 4/10 455/518 |
| 2007/0206533 | A1* | 9/2007 | Wiatrowski ......... H04W 76/066 370/329 |
| 2007/0253398 | A1* | 11/2007 | Baarman ............... H04B 7/2615 370/347 |
| 2008/0153432 | A1 | 6/2008 | Zhu et al. |
| 2008/0161029 | A1* | 7/2008 | McDonald .......... H04W 72/005 455/509 |
| 2008/0291853 | A1 | 11/2008 | Wiatrowski et al. |
| 2009/0131064 | A1* | 5/2009 | Khan .................... H04W 16/10 455/452.1 |
| 2009/0303923 | A1 | 12/2009 | Wiatrowski et al. |
| 2010/0087199 | A1* | 4/2010 | Chowdhary ........ H04W 72/005 455/450 |
| 2010/0151895 | A1 | 6/2010 | McDonald et al. |
| 2010/0279726 | A1 | 11/2010 | Bohn et al. |
| 2011/0237243 | A1* | 9/2011 | Guvenc ................ H04L 5/0032 455/423 |
| 2011/0306290 | A1* | 12/2011 | Fukuzawa ......... H04W 72/0406 455/7 |
| 2012/0230254 | A1* | 9/2012 | Otamendi ............... H04L 12/66 370/328 |

\* cited by examiner

| SCENARIO | ACTIVITY OF RECEIVER 352, PRIOR TO PRE-EMPTION CALL | ACTIVITY OF TRANSMITTER 354, PRIOR TO PRE-EMPTION CALL | FREQUENCY CHOSEN FOR PRE-EMPTION CALL |
|---|---|---|---|
| SCENARIO 1 | IDLE OR RECEIVING UPLINK CALL ON FIRST FREQUENCY | IDLE | SECOND FREQUENCY |
| SCENARIO 2 | IDLE | TRANSMITTING DOWNLINK CALL ON SECOND FREQUENCY | FIRST FREQUENCY |
| SCENARIO 3 | RECEIVING UPLINK CALL ON FIRST FREQUENCY | TRANSMITTING THE 'REPEAT' CALL ON DOWNLINK ON SECOND FREQUENCY | SECOND FREQUENCY |

*FIG. 4*

| SCENARIO | ACTIVITY OF RECEIVER 352, PRIOR TO PRE-EMPTION CALL | ACTIVITY OF TRANSMITTER 354, PRIOR TO PRE-EMPTION CALL | FREQUENCY CHOSEN FOR PRE-EMPTION CALL | WHICH RECEIVER RECEIVES THE PRE-EMPTION CALL? |
|---|---|---|---|---|
| SCENARIO 1 | IDLE OR RECEIVING UPLINK CALL ON FIRST FREQUENCY | IDLE | SECOND FREQUENCY | SECOND RECEIVER 344 |
| SCENARIO 2 | IDLE | TRANSMITTING DOWNLINK CALL ON SECOND FREQUENCY | FIRST FREQUENCY | FIRST RECEIVER 352 |
| SCENARIO 3 | RECEIVING UPLINK CALL ON FIRST FREQUENCY | TRANSMITTING THE 'REPEAT' CALL ON DOWNLINK ON SECOND FREQUENCY | SECOND FREQUENCY | SECOND RECEIVER 344 |

*FIG. 5*

| TIME REQUIRED FOR EACH SUCCESSIVE ACTION WITHIN THE 20ms TRANSMISSION INTERRUPTION | ACTIVITY OF MOBILE COMMUNICATION UNITS 210, 220, AND TRANSCEIVER 342 |
|---|---|
| 2ms | FIRST MOBILE COMMUNICATION UNIT 210, WHICH IS TRANSMITTING A ROUTINE CALL, DE-KEYS, AS DOES TRANSCEIVER 342 |
| 7.5ms | TRANSMITTER 354 EMBEDS 'FREE' STATUS SYMBOL BITS ON MICROSLOT BOUNDARY (MICROSLOT LENGTH IS 7.5ms) |
| 2ms | SECOND MOBILE COMMUNICATION UNIT 220 KEYS UP TO START TRANSMITTING PRE-EMPTION CALL |
| 7.5ms | TRANSMITTER 354 EMBEDS 'BUSY' STATUS SYMBOL BITS ON MICROSLOT BOUNDARY, SO ROUTINE CALL BY FIRST MOBILE 210 WILL NOT BE RESUMED |

*FIG. 8*

METHOD AND APPARATUS FOR FREQUENCY ALLOCATION IN A TRUNKED RADIO COMMUNICATION SYSTEM

"This application is a National Stage filing under 35 USC §371 of co-pending Patent Cooperation Treaty international application having Serial No. PCT/PL2011/000145 (the 'PCT international application') filed on Dec. 30, 2011. This application claims priority to the PCT international application, the entire contents of which are incorporated herein by reference."

FIELD OF THE DISCLOSURE

The present disclosure relates generally to trunked radio communication systems and more particularly to frequency allocation in a trunked radio communication system.

BACKGROUND

Many varieties of trunked two-way radio communications systems are known. FIG. 1 is a block diagram illustrating both a typical conventional radio system 101 and a trunked radio system 103. The communications systems of FIG. 1 may be digital or analogue.

In the conventional radio system 101, a plurality of mobile communication units SU1, SU2, . . . SU9 are formed into talkgroups A, B or C. Each talkgroup uses a separate channel CH1, CH2 or CH3 for communication. Thus, each talkgroup is served by one channel. Henceforth the term 'mobile communication unit' will be used for any wirelessly linked mobile communication unit that may be linked to the wireless communication systems discussed in the remainder of this description. The mobile communication unit may be a phone, mobile or portable radio, a smartphone, or another wirelessly linked mobile communication unit, among other possibilities.

The trunked radio system 103 and its mobile stations SU1, SU2, . . . SU9 use a pool of channels CH1, CH2 and CH3. These channels can support a virtually unlimited number of talkgroups. Thus, all talkgroups may in fact be served by any channel, and may well be served by all channels at different times. The trunked radio system 103 works to take advantage of the probability that not all talkgroups will need a channel for communication at the same time. Estimates are made about how much load a typical user will present to the system, in terms of calls per hour and duration of each call.

For a given traffic load, the trunked radio system 103 requires fewer channels, since all talkgroups can be served by all channels. With any given number of channels, the trunked radio system 103 can accommodate a much greater number of talkgroups than conventional radio systems, such as radio system 101. Hence, a primary benefit of a trunked radio system is the efficient utilization of channels. The trunked radio system allows more users to carry on more conversations, over fewer distinct channels. This applies to data and/or voice calls.

In both conventional and trunked communication systems, each call is assigned one channel. The channel comprises two frequencies. At a base station of each communication system, one frequency is used to receive a call from a mobile station. This first frequency is referred to as the receive frequency (Rx). The function of the base station is to re-transmit the call to the other members of a talk group. A second frequency is used for that re-transmission. This second frequency is referred to as the transmit frequency (Tx). In such communications systems, a console may be operated by a dispatcher, who can communicate with one or more subscribers. In multicast or simulcast systems, there may be a comparator to distribute signals to different base stations for transmission.

When a mobile communication unit initiates a new call in the known systems of FIG. 1, a receiver of the communication system receives the signal, if the signal is valid. The received signal is processed, and sent to the infrastructure of the communications system. For example, a console operator may receive the subscriber user voice/data from the mobile communication unit.

When the systems of FIG. 1 operate in 'repeat' mode, the signal received from a mobile communication unit is processed by a base station, and 'repeated' on the Tx frequency. 'Repeat' means that the received signal is re-transmitted, typically to multiple members of a talkgroup. This allows mobile communication units to communicate to one or more other mobile communication units, as well as to the console of the communications system. The repeat function may be controlled, i.e. enabled or disabled, by a console operator or a system administrator. Only a single call from a mobile communication unit can be handled by one base station at a time. So a second mobile communication unit cannot start a call when another call, from a first mobile communication unit is ongoing. Effectively the channel assigned to the base station channels is busy. Signals from two mobile communication units that tried to transmit at the same time would interfere. There would be no certainty that either signal would be recognized by base station as a valid signal. In many situations, neither the first nor the second communication unit would succeed in transmitting.

This situation may have adverse consequences when there is an uplink call ongoing from a first mobile communication unit to a base station, and a second mobile communication unit needs to place an emergency call. This might be when the user of the second mobile communication unit is in danger. The second mobile communication unit cannot initiate an emergency call, as it is not possible to preempt the ongoing uplink call, and typically the user of the second mobile communication unit simply has to wait. Thus a console operator will not receive a call from the second mobile communication unit, at a point in time when such a call really matters. A less urgent situation may occur when a second mobile communication unit needs to make a call of higher priority than a call that is already ongoing. Henceforth the term 'preemption call' will be used to describe an emergency call, or a call of higher priority than an ongoing call.

A conventional solution to this problem is to use an additional dedicated frequency to provide emergency call support. The second mobile communication unit will use the additional frequency for emergency calls. This solution ensures that a console operator will hear the emergency call, even when a call is already ongoing through the base station. However, obtaining an additional frequency is expensive. An exclusive emergency frequency would also be idle at most times.

Another known solution is to create a 'hole' in an audio stream, to allow for higher priority subscribers to interrupt. An interrupt message can be used to signal that a 'higher priority' second mobile communication unit would like to take over transmission from a first mobile communication unit that is already using a channel.

BRIEF DESCRIPTION OF THE FIGURES

The accompanying figures, where like reference numerals refer to identical or functionally similar elements throughout the separate views, together with the detailed description below, are incorporated in and form part of the specification.

The figures serve to further illustrate embodiments of concepts that include the claimed invention, and explain various principles and advantages of those embodiments.

FIG. 4 is a table showing examples of operation of the radio communication system of an embodiment.

FIG. 5 is a table showing further examples of operation of the radio communication system

FIG. 8 illustrates a numerical example of possible transmission timing.

Figure 1:
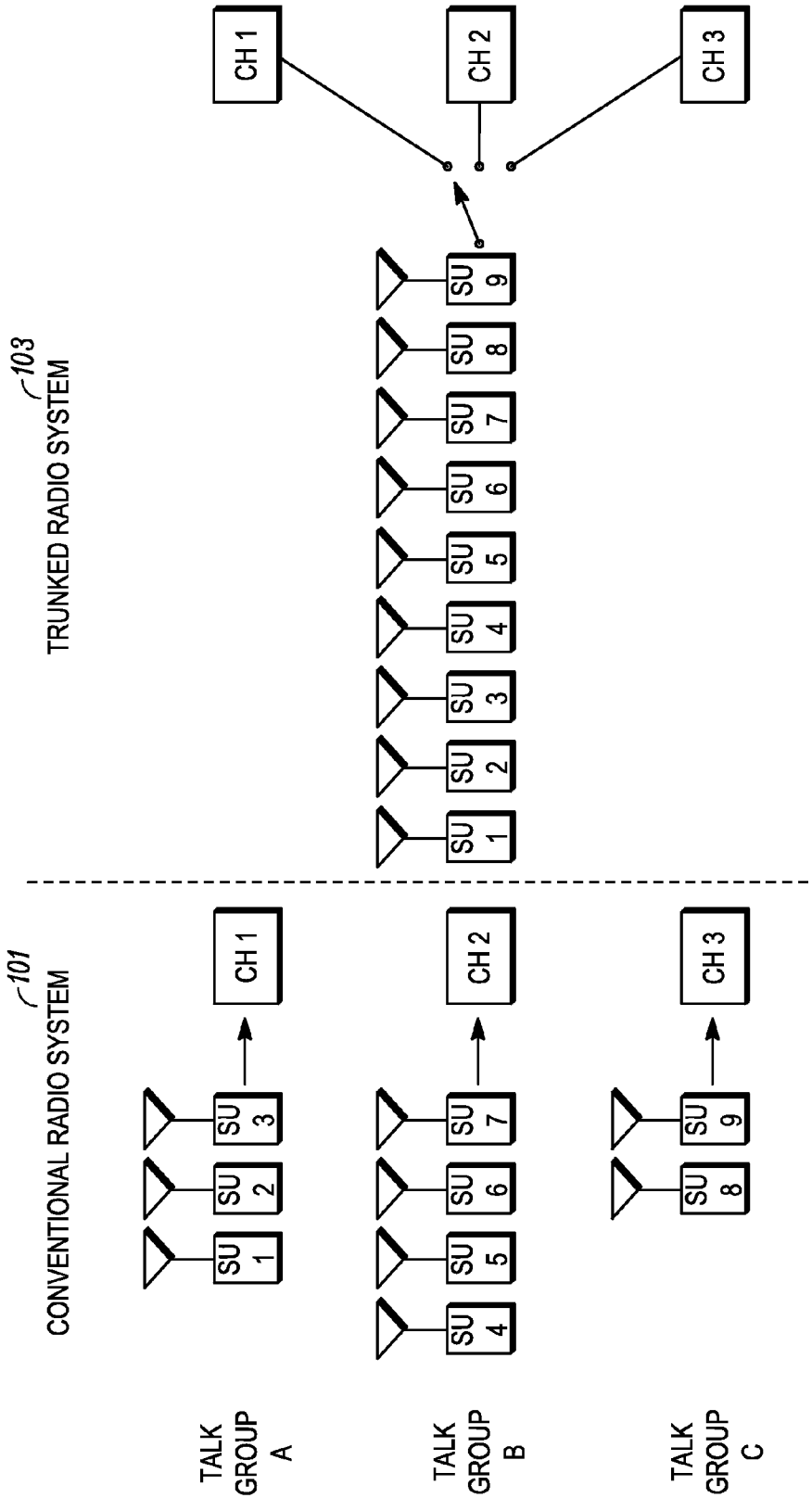
FIG. 1 is a block diagram illustrating both a conventional radio communication system and a conventional trunked radio communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A cellular two-way radio communication system comprises at least one base station, and at least one mobile communication unit. A transceiver of the base station comprises a receiver and a transmitter. The receiver is operable to receive transmissions from a mobile communication unit on a first frequency, the first frequency being assigned for reception. The transmitter is operable to transmit to one or more mobile communication units on a second frequency, the second frequency being assigned for transmission. The base station is operable to receive a preemption call from a second mobile communication unit. The preemption call is received on the first frequency, when the first frequency is not in use for reception and the second frequency is in use for transmission. Otherwise, the preemption call is received on the second frequency.

A mobile communication unit for use in a cellular two-way radio communication system is provided. The mobile communication unit is operable to transmit a preemption call to a base station on a first frequency, when the first frequency is not in use by a receiver of the base station and a second frequency is in use by a transmitter of the base station. Otherwise, the mobile communication unit transmits the preemption call on the second frequency.

The mobile communication unit may therefore transmit the preemption call on the second frequency when either: (i) the first frequency is in use by the base station for receiving a call; or (ii) the second frequency is not in use by the base station for transmitting; or (iii) neither the first frequency nor the second frequency is in use by the base station. The mobile communication unit may commence transmission of the preemption call on the second frequency, without first transmitting any interrupt signaling to the base station.

Figure 2:
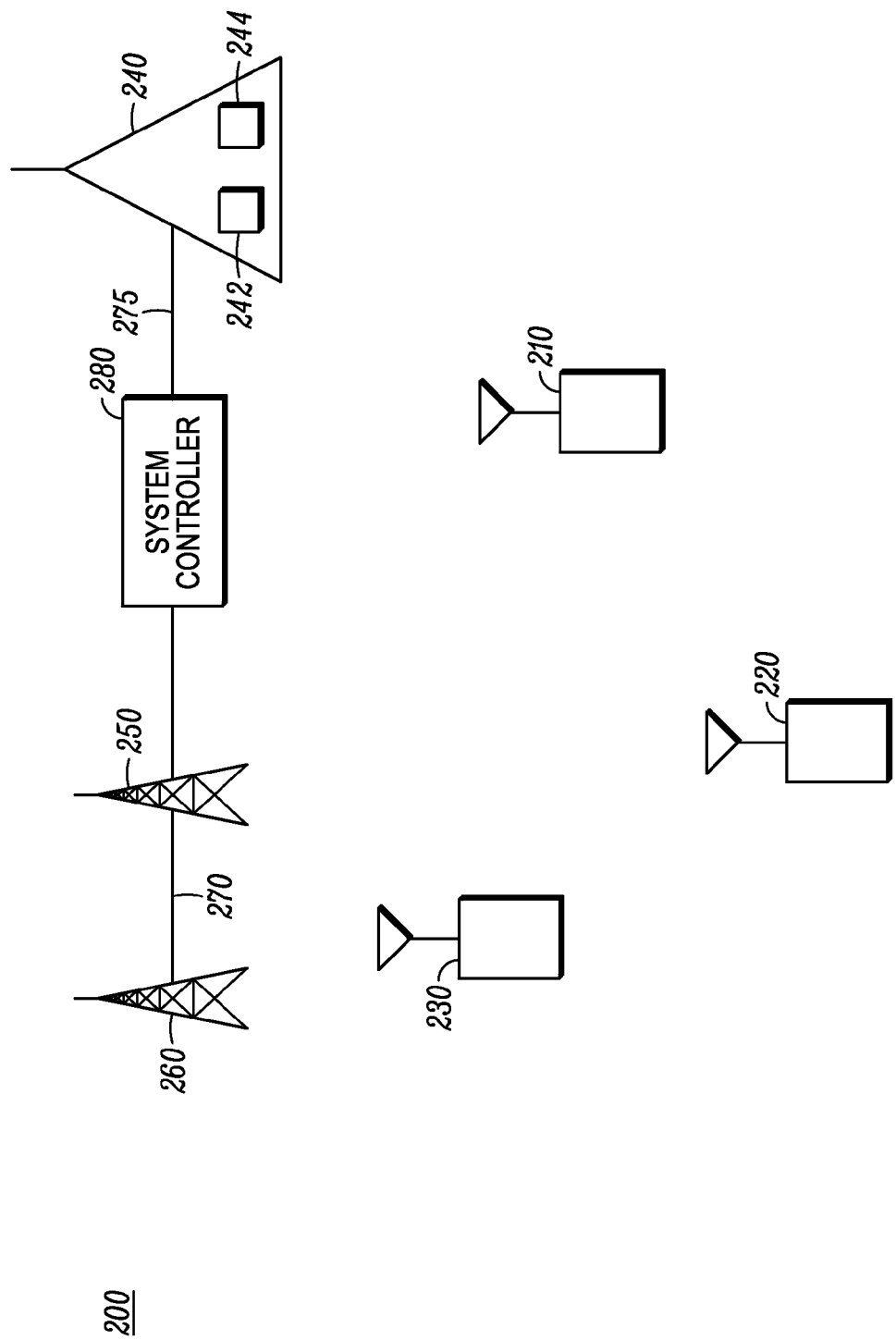
FIG. 2 schematic view of a portion of a radio communication system.

The radio communication system ensures that a preemption call initiated by a mobile communication unit will be supported by the radio communication system, even when another non-emergency call is already ongoing. No interrupt signaling is required. So, for example, a console operator can hear an emergency call from a mobile communication unit, and take appropriate action FIG. 2 is a schematic view of a portion of a radio communications system 200. Radio communications system 200 is a two-way cellular communications system. First mobile communication unit 210 is operable to communicate via first base station 240. Base station 240 is part of the infrastructure of the trunked two-way radio communication system 200. The infrastructure may also, for example, comprise further base stations. Two further base stations, second base station 250 and third base station 260, are shown. The base stations of the infrastructure may be linked by physical connections, such as exemplary links 270 and 275 shown in FIG. 2. Additionally or alternatively, the base stations of the infrastructure may be linked wirelessly. System controller 280 is part of the infrastructure of trunked two-way radio communication system 200. System controller 280 may provide processing functionality for managing the calls sent via base station 240. System controller 280 may also implement the operations that are not specifically stated as being carried out in the mobile radio subscriber unit(s). In addition, some functionality described herein as being implemented by the mobile radio subscriber units may, in alternative embodiments, be carried out by the infrastructure, such as by system controller 280.

First mobile radio subscriber unit 210 may communicate with at least one other mobile radio subscriber unit. Second mobile radio subscriber unit 220, and third mobile radio subscriber unit 230, are shown on FIG. 2. All three of the mobile communication units 210, 220, 230 may be within range of base station 240. In the following illustrative embodiment of FIGS. 2 and 3, each of the mobile communication units 210, 220, 230 will be assumed to use base station 240 for communication, rather than using 'peer to peer' operation. Also, the three mobile communication units 210, 220, 230 will be assumed to be the only mobile communication units actively involved in calls through first base station 240.

Base station 240 comprises a transceiver 242, which itself comprises a receiver and a transmitter. In addition, in some embodiments, base station 240 also comprises a second receiver 244. Second receiver 244 may be linked to transceiver 242, to allow transceiver 242 and second receiver 244 to co-ordinate their operations. A first frequency is assigned to the receiver of transceiver 242, for reception of uplink signals from one or more of mobile radio subscriber units 210-230. A second frequency is assigned to the transmitter of transceiver 242, for downlink transmission to one or more of mobile radio subscriber units 210-230. Together, the first and second frequencies comprise a channel assigned to base station 240.

Figure 3:
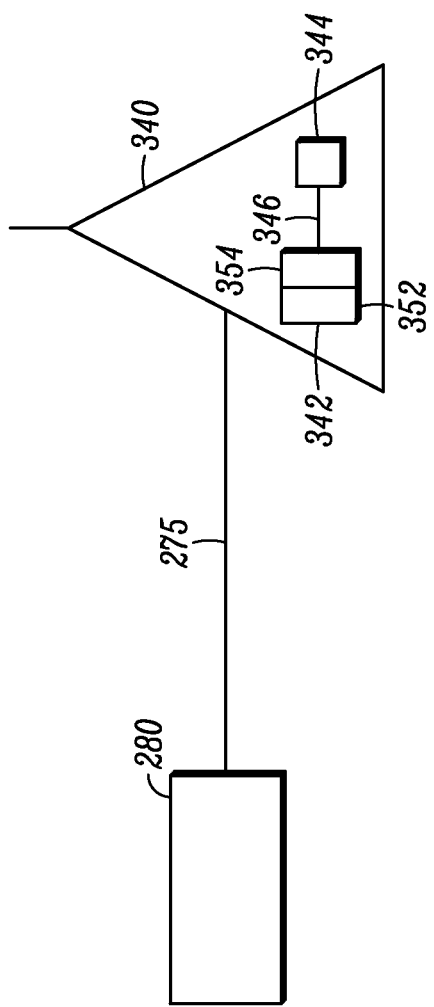
FIG. 3 is a block diagram illustrating part of the communications system of FIG. 2.

FIG. 3 illustrates one embodiment of a first base station 340, which may be the same or similar to base station 240. Base station 340 of FIG. 3 comprises transceiver 342. Within transceiver 342 are receiver 352 and transmitter 354. In some embodiments, there may be a second receiver 344. Second receiver 344 may be a module capable only of signal reception, or may be part of a second transceiver, which is not shown in FIG. 3. Link 346 provides communication between second receiver 344 and transceiver 342. Link 346 enables co-ordination of the operations of second receiver 344 and transceiver 342. In particular, second receiver 344 and transceiver 342 can rapidly signal information about their respective states of operation, i.e. whether receiver 352 or second receiver 344 is receiving, or whether transmitter 354 is transmitting.

Three possible scenarios for the operation of the radio communications system 200 are described, as scenarios 1-3, below. Reference should be made to both FIGS. 2 and 3 for these scenarios.

Scenario 1: Either: (i) none of mobile communication units 210-230 are involved in a call; or (ii) the only ongoing call is an uplink call from first mobile communication unit 210 to receiver 352 of base station 340 on the first frequency, without there being a repeat transmission from base station 340. In scenario 1, when a preemption call is initiated, for example by second mobile subscriber unit 220, then second mobile subscriber unit 220 transmits the call on the second frequency, which was assigned to transmitter 354 for transmission.

Scenario 2: A downlink call is in progress on the second frequency, from transmitter 354 to first mobile communication unit 210. Although transmitter 354 is transmitting, receiver 354 is not receiving an uplink transmission from any of mobile communication units 210-230. This situation may arise when system controller 280 provides a call from a dispatcher, which needs to be transmitted to one or more of the mobile communication units 210-230. In scenario 2, when a preemption call is initiated, for example by second mobile subscriber unit 220, then second mobile subscriber unit 220 transmits the call on the first frequency, which is the frequency assigned to receiver 352 for signal reception. Base station 340 receives the signal of the preemption call, processes it, and forwards the call to the infrastructure of the wireless communication system. In a typical usage scenario, the preemption call will be an emergency call. A console operator can then receive the emergency call.

Scenario 3: There is a 'repeat' call in progress. In scenario 3, an uplink call from first mobile communication unit 210 to receiver 352 is in progress on the first frequency, and there is also a repeat transmission of the call on the downlink from transmitter 354 to one or more of second mobile communication unit 220 and third mobile communication unit 230 on the second frequency. When a preemption call is initiated, for example by second mobile communication unit 220, then second mobile communication unit 220 transmits the call on the second frequency, which is the frequency assigned to transmitter 352 for signal transmission.

When a preemption call is forwarded to, for example, a console operator or dispatcher of the radio communication system 200, the operator or dispatcher will be able to decide on appropriate action. Such action may include notifying a talkgroup that their ongoing call is being interrupted or terminated. If the preemption call is an emergency call, a message may be provided that the second mobile communication unit 320 requires assistance.

FIG. 4 illustrates possible transmission frequencies in radio communications system 200. The table of FIG. 4 summarises the three scenarios above, which are listed in the first column of the table of FIG. 4. The second and third columns of the table of FIG. 4 state the activity of receiver 352 and transmitter 352, respectively, prior to a second mobile communication unit 220 placing a preemption call. The fourth column of the table states the frequency that the second mobile communication unit 220 will select to place a preemption call, in each of scenarios 1-3. A repeat call is in progress in scenario 3, with the first frequency in use by receiver 352, and the first frequency may be in use by receiver 352 in scenario 1. When the first frequency is in use by receiver 352, there is an increased probability of successfully placing a preemption call, because second mobile communication unit 220 is able to use the second frequency, i.e. the frequency assigned to transmitter 354 for downlink transmissions. So, even when an uplink call is ongoing, a preemption call is possible.

Second receiver 344 may be provided, in order to allow second mobile communication unit 220 to initiate a preemption call on the second frequency. The table shown in FIG. 5 summarizes the operation of second receiver 344, in this embodiment. The first four columns of the table of FIG. 5 correspond to those of the table of FIG. 4. The fifth column of the table of FIG. 5 shows that receiver 344 can receive the preemption call from second mobile communication unit 220 in scenario 1 and scenario 3. Receiver 344 receives the preemption call on the second frequency in both scenario 1 and scenario 3 (see the fourth column of the table of FIG. 5). This contrasts with known systems in which an additional frequency must be available, for a preemption call to be placed when a base station is already active in an ongoing call. An advantage of second receiver 344 may be that a preemption call through second receiver 344 may be less prone to being saturated by adjacent channel activity than in known systems.

In order to facilitate use of second receiver 344, transmitter 354 may transmit signaling indicating that receiver 352 is receiving a call. For example, transmitter 354 may transmit frames comprising status symbols indicating that receiver 352 is receiving a call, in a situation where receiver 352 is receiving a call and transmitter 354 is transmitting a repeat of the call on a downlink. So, when transmitter 354 is transmitting a call on the second frequency, it can embed status symbol 'receiver busy' bits in the downlink frames. However, when receiver 352 is receiving a call on the first frequency and transmitter 354 is not transmitting a call on the downlink, transmitter 354 may transmit idle packets that indicate that receiver 352 is receiving a call. The status bits can be embedded in the idle packets. 'Receiver busy' status bits prevent a situation arising in which two mobile communication units are trying to transmit on the same frequency to base station 340.

When transmitter 354 is transmitting on the second frequency, transmitter 354 may interrupt transmission temporarily and notify second receiver 344 that transmission has been interrupted. Notification may be made via link 346. During a temporary interruption of the transmission, the second receiver 344 receives any preemption call on the second frequency.

Transmitter 344 may provide an interruption of transmission for a first predetermined time period, and during this first predetermined time period, the second receiver is enabled. Transmitter 354 may regularly provide interruptions of transmission, with each interruption being for the first predetermined time period, and successive interruptions being separated by a second predetermined time period.

During any interruption of transmission from transmitter 354, second receiver 344 may not detect a preemption call from the second mobile communication unit 220, in which case the transmitter is operable to resume transmission on the second frequency, at the end of the interruption. However, second receiver 344 may detect a preemption call from second mobile communication unit 220 during the interruption. In this case, transceiver 342 is operable to route the preemption call within the cellular two-way radio communication system, and transmitter 354 is operable to postpone further transmission on the second frequency. However, when the preemption call finishes, the transmitter 354 is operable to resume transmission on the second frequency.

The preemption call may be an emergency call from the second mobile communication unit 220. Second receiver 344 may route the preemption call to a dispatcher of the cellular two-way radio communication system, prior to transceiver 342 taking over the preemption call.

A numerical example of the interruptions to transmission from transmitter 354 may be as follows: The first predetermined period may comprise a number of milliseconds, such as 20 ms, which will be the length of each interruption of transmission by transmitter 354. The second predetermined period may be several seconds, such as 3-5 seconds. The second predetermined period determines the time period that elapses between each interruption of transmission. Thus, for example, every 3 seconds, transmitter 354 may stop transmission for 20 ms. Transmitter 354 informs second receiver 344 that transmission has stopped, or is about to be stopped. Second receiver 344 is enabled, and may detect a signal, e.g. carrier squelch. When no valid signal is detected, the second receiver 344 is inhibited after the configured 20 ms has elapsed. At that point, the transceiver 342 of base station 340 re-starts transmission, for example of a repeat call that was ongoing before the 20 ms interruption. The absence of a valid signal during the 20 ms interruption means that no mobile subscriber unit within range of base station 340 tried to initiate a preemption call, for example an emergency call. When second receiver 344 does receive a valid preemption call during the 20 ms interruption of transmission, second receiver 344 informs transceiver 342 that a preemption call has started and is ongoing, so transmitter 354 will not start or re-start transmission at the end of the 20 ms. The second receiver 344 will send the received signals of the preemption call, after processing, to system controller 280. When the preemption call finishes, second receiver 344 informs transmitter 354, which is then able to re-start transmission.

Continuing this numerical example, the start of the 20 ms interruption of transmission by transmitter 354 may provide time for transmitter 354, and any mobile communication devices that were transmitting on the first frequency to receiver 352, to de-key. This action may take the first 2-3 ms of the 20 ms interruption, with a time of 3 ms being likely for higher powered transmissions. There may then be a period of 15 ms, in which second mobile communication unit 220 is able to start transmission of the preemption call. The last 2-3 ms of the 20 ms interruption may be a period in which transmitter 354 is keying up, when no preemption call has started during the first 17-18 ms of the 20 ms interruption. Thus a 20 ms interruption of transmission may provide a clear 15 ms interval for second mobile communication to start the preemption call.

Second receiver 344 may be part of a second transceiver within base station 340, or may be part of a second base station linked to base station 340, neither of which is shown in FIG. 2 or 3. When second receiver 344 is provided as part of a second transceiver within base station 340 or as part of a second base station, it can support a two way preemption call. Thus a console could transmit to and receive from the second mobile communication unit, during the preemption call, without needing transmitter 354 or receiver 352 of the transceiver 342.

In an embodiment, transmitter 354 and second receiver 344 may be provided with information about the launch time for each frame. Such signaling has been used in known systems for simulcast transmissions. Second receiver 344 will then cancel the signal transmitted by transmitter 354, and then listen for a preemption call. This operation enables second receiver 344 to detect a preemption call, without requiring that transmitter 354 provide temporary interruptions to its transmission. This embodiment may be suited to situations in which the transmission power of transmitter 354 is not greater than the transmission power of second mobile subscriber unit that is starting the preemption call.

In an embodiment, a preemption call may be supported without provision of second receiver 344. In this case, when transmitter 354 is transmitting on the second frequency, the transmitter will interrupt transmission temporarily. During the temporary interruption of the transmission, receiver 352 is operable to receive the preemption call, on the second frequency. The transmission interruption may be for the first predetermined time period, described previously. During the first predetermined time period, receiver 352 is enabled. As also described previously, transmitter 354 may interrupt transmission regularly, each interruption being for the first predetermined time period, and successive interruptions being separated by the second predetermined time period.

When receiver 352 does not detect a preemption call from second mobile communication unit 320, during the temporary interruption of the transmission, transmitter 354 is operable to continue transmitting on the second frequency, at the end of the temporary interruption. However, when receiver 352 detects a preemption call from second mobile communication unit 320 during the temporary interruption of the transmission, transmitter 354 may commence communication with second mobile communication unit 320. In this case, transmitter 354 will postpone further transmission of an earlier call, the earlier call having been in progress prior to the temporary interruption of the transmission. When the preemption call finishes, transmitter 354 is operable to re-commence transmission on the second frequency. Once again, the preemption call may be an emergency call from the second mobile communication unit, and the first transceiver is operable to route the preemption call to a dispatcher of the cellular two-way radio communication system.

Transmitter 354 may interrupt transmission at a point in a call when only the least important frames will be lost, i.e. not be transmitted. As an example, in the 'Astro' communications system, it may be the 'IMBE8/9' or 'IMBE17/18' frames that are not transmitted. This selection of frames to 'miss out' may minimize the impact on voice quality. It may also be possible to ensure that there is no impact on payload encryption.

At a hardware level, system pins provided on circuit boards of the 'Astro' communications system, and the 'Wildcard feature' can be used to implement aspects of the invention. Appropriate signals to these system pins will selectively inhibit and enable the first transceiver 342 and the second receiver 344. Operation of the embodiments described above can employ the 'fast channel change' and 'fast carrier detection' functionality of some conventional radio systems, for example versions of 'Astro' communications system that support these.

Known systems do not allow a transceiver 342 in a base station to dekey. Any opportunity for an emergency calls to interrupt an ongoing call in known systems requires that a mobile communication unit provide interrupt signaling. This is complex, and may require call handoff, before an emergency call can begin.

Figure 6:
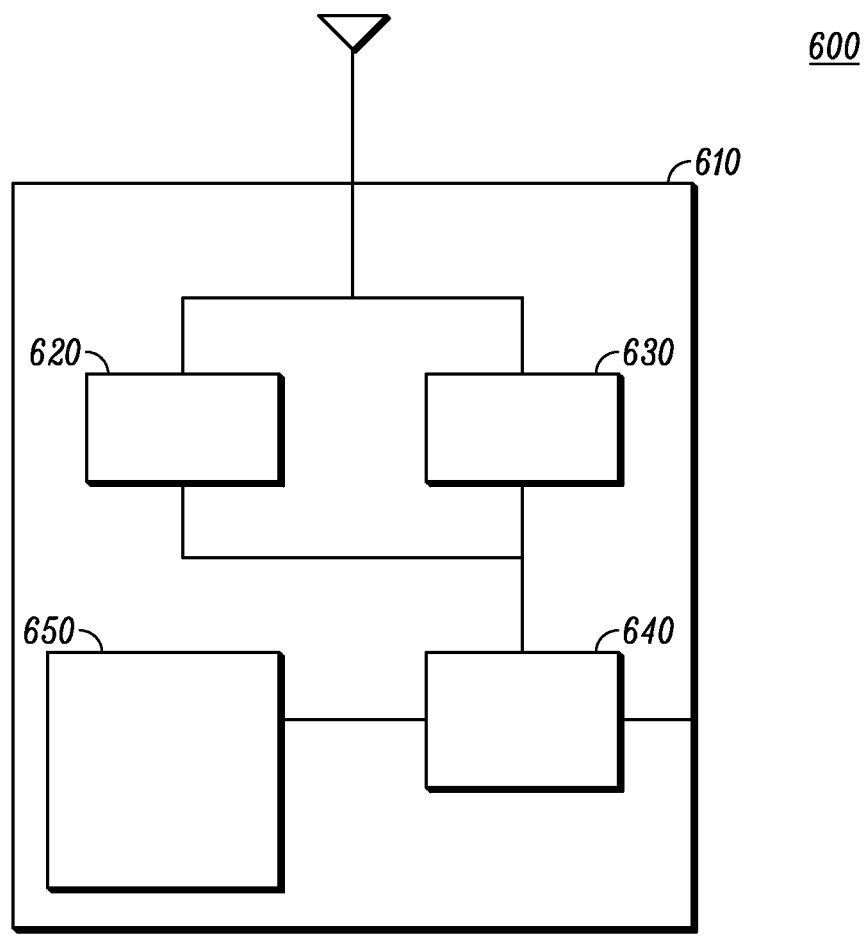
FIG. 6 illustrates a mobile communication unit.

FIG. 6 shows a mobile communication unit 600, for use in communication system 200. Within main body 610 of mobile communication unit 600 are receiver 620 and transmitter 630. Processor 640 controls mobile communication unit 600, and may carry out the operations described below in relation to FIG. 6. User interface 650 may be mounted on the front surface of mobile communication unit 600, and may comprise a touch screen or other user actuated components.

Mobile communication unit 600 may correspond to first mobile communication unit 210, second mobile communication unit 220, and/or third mobile communication unit 230.

Mobile communication unit 600 is operable to transmit a preemption call to base station 340 on the first frequency, when the first frequency is not in use by a receiver of the base station and a second frequency is in use by a transmitter of the base station. Otherwise, when these two conditions are not both met, mobile communication unit 600 transmits the preemption call on the second frequency.

Mobile communication unit 600 is therefore operable to transmit the preemption call on the second frequency when either: (i) the first frequency is in use by base station 340 for receiving a call; or (ii) the second frequency is not in use by base station 340 for transmitting; or (iii) neither the first frequency nor the second frequency is in use by base station 340. As explained in connection with FIGS. 2-5, therefore, mobile communication unit 600 can transmit a pre-emption call, using the second frequency, which was assigned to transmitter 354 for transmission, rather than reception.

Mobile communication unit 600 may be operable to commence transmission of the preemption call on the second frequency, without first transmitting any interrupt signaling to the base station. This functionality may be achieved using 'busy bit signaling'. This signaling from transmitter 354 informs mobile communication unit 600 about the status of transceiver 342. Thus, logic 630 in mobile communication unit 600 can handle the contention control, i.e. decide whether and when to transmit a preemption call. This may therefore be achieved without mobile communication unit 600 having to first transmit interrupt signally, in contrast to known arrangements.

When transmitter 354 is transmitting on the second frequency, it can provide signalling to mobile communication device 600, by including 'busy bits' on microslots in its transmission. The 'busy bit' signalling in the microslots can indicate that the transmitter is transmitting on the second frequency, but that the receiver is not receiving on the first frequency. Therefore mobile communication device 600 knows that the first frequency is available, and can then select the first frequency for the pre-emption call.

However, when the first frequency is in use by receiver 352, and the second frequency is not in use by transmitter 354, this can also be signalled to mobile communication unit 600. Transmitter 354 may transmit idle frames to mobile communication unit 600, conveying the busy bits, when transmitter 354 is not transmitting a downlink call. Mobile communication unit 600 is then operable to select the second frequency, to transmit its pre-emption call. Mobile communication unit 600 does not need to send interrupt signalling, prior to the pre-emption call, but can just start the call. The pre-emption call may therefore be routed more quickly through the communications system, for example to a console or another mobile communication unit, than with known systems. When transmitter 354 is transmitting a downlink call, and mobile communication unit 600 wants to transmit a pre-emption call, mobile communication unit 600 can wait until the status symbols in the received frames indicate either that the first frequency has become free, or that the base station has finished or been interrupted. Thus mobile communication unit 600 should only have to wait for the second predetermined period, before transmitter 354 interrupts transmission and mobile communication unit 600 can start a pre-emption call.

When both the first and second frequencies are in use by transceiver 342, this can also be signalled with busy bits that mobile communication device 600 receives from transmitter 354.

The operation of mobile communication unit 600 therefore differs from the 'emergency revert' function in some known communication systems. Emergency revert operation is statically determined, a priori. The choice of frequency for an emergency call from a mobile communication unit, with emergency revert, does not depend on the state of the transmit and receive frequencies of the base station, at the time that the emergency call needs to be made. Thus an emergency revert function would, at least, not show the selectivity shown in the final column of the table of FIG. 4.

Mobile communication unit 600 may also routinely take part in 'non-preemption' calls. These routine calls would be calls between mobile communication unit 600 and other communication units or the infrastructure of the communications system. Here 'routine' means that they are neither emergency calls, nor are not calls of higher priority than other calls. When routed through base station 340, the routine calls would use the first frequency to transmit on an uplink to receiver 352.

Before initiating a routine call, mobile communication unit 600 can check if another mobile subscriber unit is already in a call to receiver 352. Mobile communication unit 600 can do this by checking for status symbols on the downlink from transmitter 354. If there are status symbols indicating that receiver 352 is busy, then mobile communication unit 600 will not start a call.

When involved in a routine call, mobile radio communication unit 600 may itself interrupt its own transmission, temporarily, on the first frequency. An interruption of uplink transmission from mobile radio communication unit 600 provides an opportunity for another mobile communication unit to commence a pre-emption call. This interruption of uplink transmission from mobile communication unit 600 may be synchronised with an interruption of transmission on the second frequency from transmitter 354.

The interruption of the uplink transmission from mobile communication unit 600 may be for a third predetermined time period. The third predetermined time period may correspond to the first predetermined time period, for which transmitter 354 ceases downlink transmission. Interruptions of uplink transmission from mobile communication unit 600 may be repeated, spaced by a fourth predetermined time period. The fourth predetermined time period may correspond to the second predetermined time period, which is the interval between interruptions of transmission by transmitter 354.

Mobile communication unit 600 may interrupt transmission at a point in its call when only the least important frames will not be transmitted. The selection of frames to 'miss out' may minimize the impact on voice quality, and/or may ensure that there is no impact on payload encryption. As an example, in the 'Astro' communications system, it may be the 'IMBE8/9' or 'IMBE17/18' frames that are not transmitted. The base station may be configured to accept that the 'missed' frames are not available, i.e. to 'can' them.

Mobile communication unit 600 may postpone resumption of its routine call transmission, when a pre-emption call starts from another mobile communication unit, during the interruption of transmission from mobile communication unit 600. However, mobile communication unit 600 may resume transmission of the routine call, when no other mobile communication unit starts a pre-emption call during the interruption of transmission from mobile communication unit 600. Mobile communication unit 600 may also resume transmission of its routine call, at the end of a pre-emption call that started from another mobile communication unit during the interruption of transmission from mobile communication unit 600.

The feature of transmission interruption by mobile communication unit 600 may be supported by the status symbols, i.e. 'receiver busy' bits, which are transmitted to the mobile communication unit 600. When mobile communication unit 600 has interrupted its routine call, the busy bits inform mobile communication unit 600 when receiver 352 remains in use by another mobile communication unit that has started a preemption call. Thus mobile communication unit 600 knows that the interrupt call from another mobile is still ongoing, and that mobile communication unit 600 cannot yet resume transmission of its routine call, or any new call.

When mobile communication unit 600 wishes to initiate a preemption call, it can verify that the first frequency is clear, using the status symbols that it receives. When mobile communication unit 600 has been informed that the first frequency is clear, it can commence its call immediately. When mobile communication unit 600 has been informed that the first frequency is busy, it waits until the status symbols indicate that either the first frequency is free again, or that transmission on the second frequency has either ended or been interrupted.

Transmitter 354 may transmit special status symbols during an interruption of transmission by mobile communication unit 600. Those special bits may indicate that only a preemption call may be made, during the transmission interruption. This would prevent another mobile subscriber unit from initiating a routine call, during the interruption of transmission by mobile communication unit 600. Alternatively, the mobile communication units may be programmed to only start a routine uplink call when the first frequency has been free for longer than a time interval corresponding to the first or third predetermined period. This would prevent another mobile subscriber unit from initiating a routine call, during the interruption of transmission by mobile communication unit 600.

In the example where transmitter 354 interrupts its transmission on the second frequency every 3-5 milliseconds, for 20 ms, then mobile communication unit 600 will have a maximum wait of only 3-5 seconds, before it can initiate a preemption call.

Figure 7:
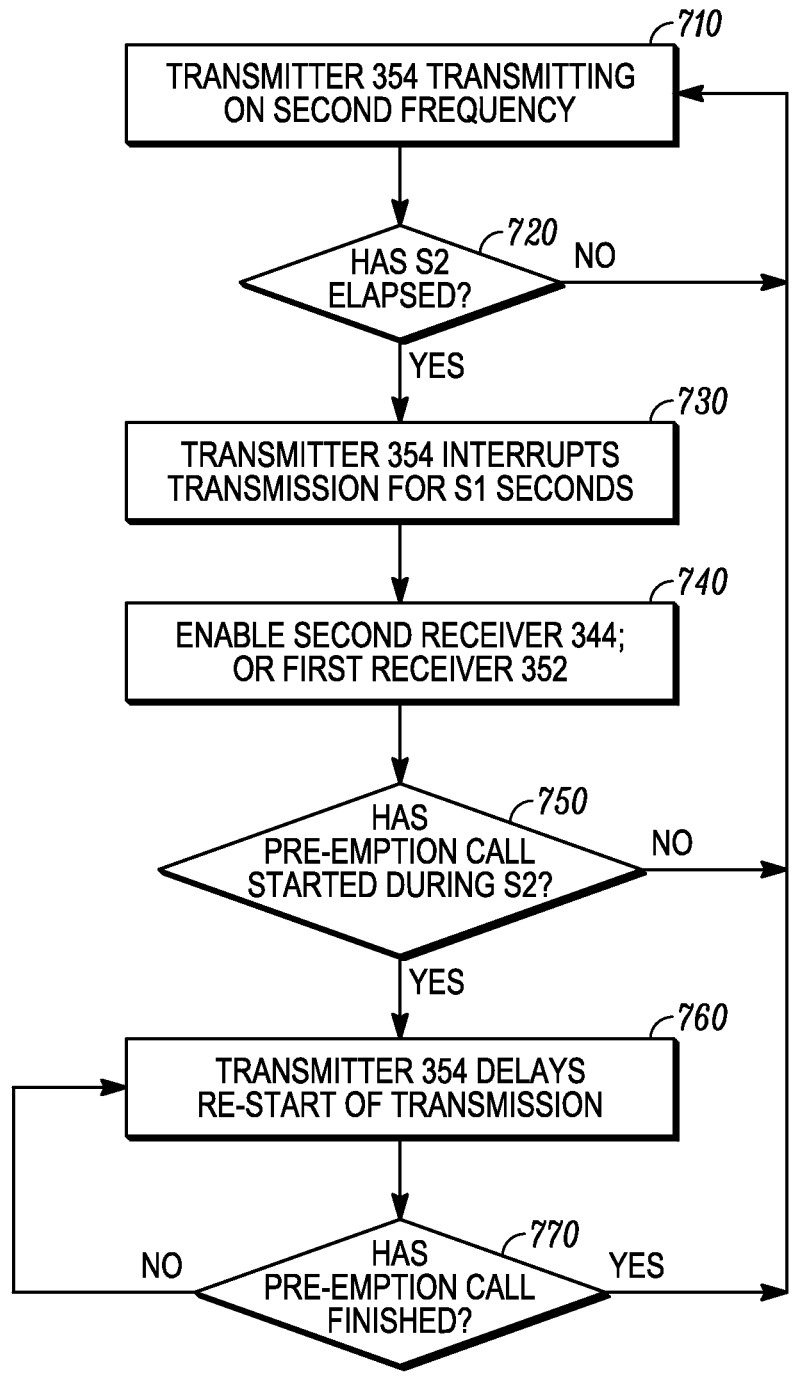
FIG. 7 is a flowchart illustrating operation in accordance with an embodiment.

FIG. 7 illustrates, as flowchart 700, the operation of the communication system of FIGS. 2 and 3. At 710, transmitter 354 is transmitting a downlink call on the second frequency. Time period S2 is the second predetermined time period, i.e. the time between transmission interruptions by transmitter 354. In the numerical example given earlier this, would be a time in the range 3-5 seconds. At decision 720, when time period S2 has elapsed since the previous interruption to transmission from transmitter 354, the flowchart moves to block 730. When S2 has not elapsed since the previous interruption to transmission from transmitter 354, the flowchart returns to 710 and transmitter 354 continues transmission.

At block 730, transmitter 354 interrupts transmission for S1 seconds, where S1 is the first predetermined time interval. In the numerical example given earlier, this was 20 ms. At block 740, second receiver 344 is enabled, when base station 340 comprises second receiver 344. Receiver 352 is enabled, when base station 340 does not comprise second receiver 344. Receiver 352 or second receiver 344, as appropriate, will detect any preemption call that starts during S1. When a call is detected, at decision 750, the flowchart moves to block 760. When a preemption call is not detected, the flowchart returns from decision 750 to block 710.

At block 760, transmitter 354 delays further transmission of the call that was in progress prior to the interruption that started at block 730. As shown at decision 770, this delay continues as long as the preemption call is active.

FIG. 8 provides another numerical example of the timing of transmissions to/from a mobile communication unit 600. The table of FIG. 8 shows, in the left column, each part of a 20 ms interruption of transmission. The right column shows what activity occurs in the time interval of the left column. The four time periods in the left column of the table of FIG. 8 all fit within the 20 ms provided in this illustrative example.

In an embodiment, the first interruption of transmission by transmitter 354 and/or mobile communication unit 600 may only occur after a fifth predetermined period. The fifth predetermined period may be significantly greater than the second predetermined period. The fifth predetermined period may allow a short call to be completed, without any interruptions to transmission. However, once the fifth predetermined period has elapsed from the start of a call, transmitter 354 and/or mobile communication unit 600 would interrupt their transmissions. There may then be repeated interruptions, each for the first or third predetermined period and spaced in time by the second or fourth predetermined periods.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A cellular two-way radio communication, the system comprising:
   at least one base station; and
   at least one mobile communication unit;
   wherein the base station includes
      a transceiver; and
      a second receiver; and
   wherein the transceiver includes
      a receiver, operable to receive transmissions from a mobile communication unit on a first frequency, the first frequency being assigned for reception; and
      a transmitter, operable to transmit to one or more mobile communication units on a second frequency, the second frequency being assigned for transmission; and
   wherein the second receiver is separate from the receiver of the transceiver, and is operable to receive the preemption call on the second frequency; and
   wherein the base station is operable to receive a preemption call from a second mobile communication unit
      on the first frequency, when the first frequency is not in use for reception and the second frequency is in use for transmission; and
      on the second frequency, otherwise; and
   wherein, when the transmitter of the transceiver is transmitting on the second frequency, the transmitter is operable to interrupt transmission temporarily and to notify the second receiver that transmission has been interrupted; and
   during a temporary interruption of the transmission, the second receiver is operable to receive the preemption call from the second mobile communication unit on the second frequency.

2. The cellular two-way radio communication system of claim 1, wherein:
   the transmitter is operable to transmit signaling indicating that the receiver is receiving a call.

3. The cellular two-way radio communication system of claim 2, wherein:
   when the receiver is receiving a call and the transmitter is transmitting a repeat of the call on a downlink, the transmitter is operable to transmit frames comprising status symbols, the status symbols indicating that the receiver is receiving a call;
   when the receiver is receiving a call and the transmitter is not transmitting a call on the downlink, the transmitter is operable to transmit idle packets, the idle packets indicating that the receiver is receiving a call.

4. The cellular two-way radio communication system of claim 1, wherein:
   when the transmitter is transmitting on the second frequency, the transmitter is operable to provide an interruption of transmission for a first predetermined time period; and
   during the first predetermined time period, the second receiver is enabled.

5. The cellular two-way radio communication system of claim 4, wherein:
   when the transmitter is transmitting on the second frequency, the transmitter is operable to provide interruptions of transmission regularly, each interruption being for the first predetermined time period, and successive interruptions being separated by a second predetermined time period.

6. The cellular two-way radio communication system of claim 4, wherein:
   when the second receiver detects a preemption call from the second mobile communication unit during the first predetermined time period, the transceiver is operable to route the preemption call within the cellular two-way radio communication system, and the transmitter is operable to postpone further transmission on the second frequency.

7. The cellular two-way radio communication system of claim 1, wherein:
   when the second receiver does not detect a preemption call from the second mobile communication unit during the temporary interruption of the transmission, the transmitter is operable to resume transmission on the second frequency, at the end of the temporary interruption.

8. The cellular two-way radio communication system of claim 1, wherein:
   the transmitter and the second receiver are operable to receive launch time information for frames transmitted by the transmitter, whereby the second receiver is operable to detect a preemption call without interruption of transmission by the transmitter.

9. The cellular two-way radio communication system of claim 1, wherein:

when the transmitter is transmitting on the second frequency, the transmitter is operable to interrupt transmission temporarily; and during a temporary interruption of the transmission, the receiver is operable to receive the preemption call on the second frequency.

10. The cellular two-way radio communication system of claim 9, wherein:

when the transmitter is transmitting on the second frequency, the transmitter is operable to provide an interruption of transmission for a first predetermined time period; and during the first predetermined time period, the receiver is enabled.

11. The cellular two-way radio communication system of claim 10, wherein:

when the transmitter is transmitting on the second frequency, the transmitter is operable to provide interruptions of transmission regularly, each interruption being for the first predetermined time period, and successive interruptions being separated by a second predetermined time period.

12. The cellular two-way radio communication system of claim 11, wherein:

when the receiver detects a preemption call from the second mobile communication unit during the temporary interruption of the transmission, the transceiver is operable to:

commence communication with the second mobile communication unit; and postpone further transmission of an earlier call, the earlier call having been in progress prior to the temporary interruption of the transmission.

13. The cellular two-way radio communication system of claim 9, wherein:

when the receiver does not detect a preemption call from the second mobile communication unit during the temporary interruption of the transmission, the transmitter is operable to continue transmitting on the second frequency, at the end of the temporary interruption.

14. A mobile communication unit for use in a cellular two-way radio communication system, the mobile communication unit comprising:

a transmitter; and a processor coupled to the transmitter, and configured to control the transmitter to transmit a preemption call to a base station on a first frequency, when the first frequency is not in use by a receiver of the base station and a second frequency is in use by a transmitter of the base station; and otherwise transmit the preemption call on the second frequency;

to provide, when the transmitter is transmitting a routine call on the first frequency, a temporary interruption to transmission of the routine call; and synchronizing the temporary interruption to transmission of the routine call with at least one of a group consisting of an interruption of transmission by the transmitter on the second frequency, and an interruption of reception by the receiver on the first frequency.

15. The mobile communication unit of claim 14, wherein the processor is further configured control the transmitter to transmit the preemption call on the second frequency when either:

the first frequency is in use by the base station for receiving a call; or the second frequency is not in use by the base station for transmitting; or neither the first frequency nor the second frequency is in use by the base station.

16. The mobile communication unit of claim 14, wherein the processor is further configured control the transmitter to commence transmission of the preemption call on the second frequency, without first transmitting any interrupt signaling to the base station.

17. The mobile communication unit of claim 14, wherein the processor is further configured to provide repeated interruptions to transmission of the routine call, the time between successive interruptions corresponding to the time between successive interruptions to transmission by the transmitter on the second frequency.

18. The mobile communication unit of claim 14, wherein the processor is further configured to provide an interruption at a point in a routine call when only the least important frames will not be transmitted.

* * * * *